M. J. McCormick.
Vault Cover.
N° 58,859.    Patented Oct. 16, 1866.
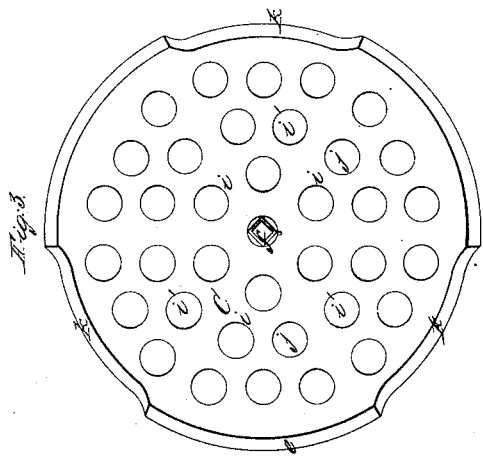
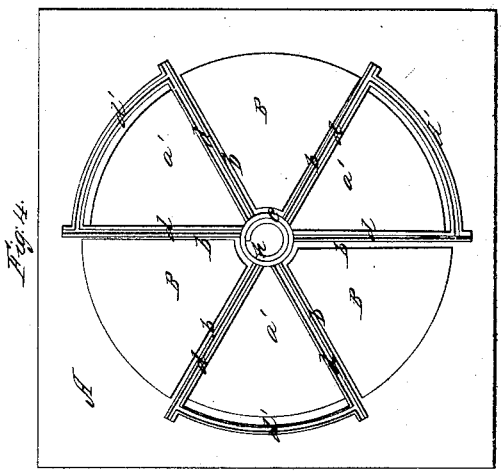
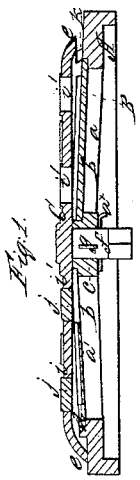
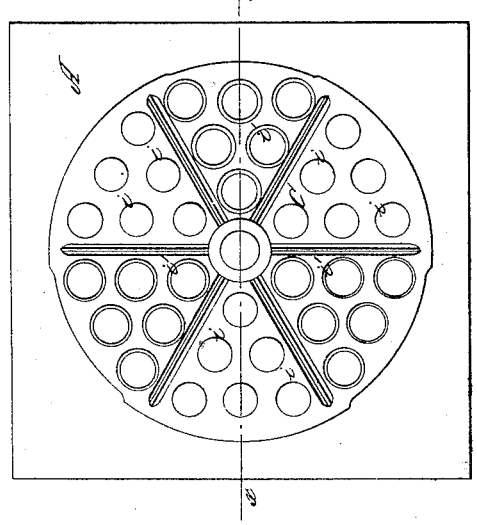
Witnesses:
F. A. Jackson
Alex J. Roberts
Inventor:
M. J. McCormick

UNITED STATES PATENT OFFICE.

M. J. McCORMICK, OF NEW YORK, N. Y.

IMPROVED VAULT-LIGHT.

Specification forming part of Letters Patent No. 58,859, dated October 16, 1866.

*To all whom it may concern:*

Be it known that I, MICHAEL J. McCORMICK, of the city, county, and State of New York, have invented a new and Improved Ventilating Vault-Light Cover; and I do hereby declare that the following is a full, clear, and exact description thereof, which will enable others skilled in the art to make and use the same, reference being had to the accompanying drawings, forming a part of this specification, in which—

Figure 1 is a vertical section of my invention, taken in the line $x\ x$, Fig. 2; Fig. 2, a plan or top view of the same; Fig. 3, a detached inverted plan of the adjustable cover; Fig. 4, a plan of the plate on which the adjustable cover is secured.

Similar letters of reference indicate like parts.

This invention relates to a new and useful improvement in vault-light covers, as hereinafter fully shown and described, whereby ventilation is obtained without removing the cover from its plate or bed.

The great defect in the ordinary vault-light covers consists of an absence of any ventilating means, and during warm weather the covers require to be raised from the holes and a framing or guard placed over the latter in order to prevent persons from falling into them. These framings or guards obstruct the sidewalk, and are attended with considerable trouble in adjusting them over the holes, removing them therefrom, and replacing the covers.

My invention, it is believed, fully obviates this objection, and a vault-cover is obtained simple in construction, capable of being manufactured economically, and adjusted, when required, with the greatest facility, in order to obtain necessary ventilation.

A represents a cast-iron plate or bed, which may be of rectangular or other suitable form, and of any proper dimensions. This plate or bed is cast with openings $a\ a'$, (six, more or less,) each forming a part of a circle, the sides of the openings radiating from a common center. (See Fig. 4.)

The spaces between the openings $a$ are radial bars $b$, which connect a central annular hub, $c$, with the main portion of the plate or bed A, as shown in Figs. 1 and 4.

The openings $a$, three in number, or one-half of the whole number in the plate or bed A, are covered with glass B, the sides of which are bedded in the bars $b$, the inner ends bedded in the annular hub $c$, and the outer ends bedded in the plate A, any suitable cement being used to insure water-tight joints around the plates of glass B.

Each bar $b$ has a vertical edge or rib, $d$, upon it, extending its whole length, and having a grooved or concave upper surface to form water-channels, and the outer ends of the bars $b$, in front of the openings $a'$, which are not covered with glass plates, are connected by curved ribs $d'$, which are also grooved, or have a concave upper surface, to form water-channels, as shown in Fig. 4.

The plate or bed A is slightly inclined downward from its center or hub $c$ all around. (See Fig. 1.)

C represents a circular plate of cast-iron, slightly concave at its under surface, and having a pendent lip, $e$, at its edge to lap over the ribs $d'$, as shown in Fig. 1. This plate C is also provided with a central pendent pin, $f$, which passes through the annular hub $c$, and is secured therein by a pin, $a^\times$, and has a lateral projection, $g$, which works in a recess, $h$, in the hub, and determines the adjusting movement of the plate C.

The plate C is cast with openings $i\ i'$, the former having glass lenses $j$ fitted in them, and the latter being open, or not provided with glass lenses. These openings $i\ i'$ are so disposed or arranged that by turning the plate C in one direction the openings $i'$ may be brought over the openings $a$ in the plate or bed A, and ventilation obtained through the vault-cover, and by moving or turning the vault-cover in the opposite direction, so that the lenses $j'$ will be moved over the openings $a$, and the openings $i'$, without lenses, moved over the glass plates B, and a close vault-cover obtained. The projection $g$, working in the recess $h$, prevents the plate C being turned unnecessarily far in either direction.

Whenever the vault-cover requires washing it may be readily done by turning the plate C so that the openings $i'$ will be over the glass plates B, and pouring water on the plate C, the water that passes through the openings $i'$ falling upon the glass plates B, and passing off the outer ends of the same through notches $k$, made in the lip $e$ of plate C, the water-channels in the upper surfaces of the ledges or ribs $d$ $d'$ carrying off all water which may splash up from the glass plates B.

I claim as new and desire to secure by Letters Patent—

1. The adjustable plate C, provided with openings $i$ $i'$, the former being provided with lenses $j'$, in combination with the openings $a$ $a'$ in the plate A, the openings $a$ being covered with glass plates B, and the plate C fitted over the openings in the plate A, and all arranged substantially as and for the purpose set forth.

2. The ledges or ribs $d$ $d'$, provided with grooved or concave upper surfaces, when used in connection with the plates A and C, substantially as and for the purpose specified.

The above specification of my invention signed by me this 5th day of September, 1866.

ML. J. McCORMICK.

Witnesses:
WM. F. McNAMARA,
ALEX. F. ROBERTS.